United States Patent [19]

Sugiyama

[11] 4,267,547

[45] May 12, 1981

[54] THEFT PREVENTION APPARATUS FOR VEHICLES

[75] Inventor: Kazuo Sugiyama, Mitaka, Japan

[73] Assignee: Dentan Co., Ltd., Tokyo, Japan

[21] Appl. No.: 20,342

[22] Filed: Mar. 14, 1979

[30] Foreign Application Priority Data

Mar. 14, 1978 [JP] Japan .................................. 53/28831

[51] Int. Cl.³ ............................................ B60R 25/10
[52] U.S. Cl. ...................................... 340/65; 340/539
[58] Field of Search ...................... 340/63, 64, 65, 568, 340/571, 572, 539; 325/111, 117, 118; 455/95, 99

[56] References Cited

U.S. PATENT DOCUMENTS 3,461,423  8/1969  Trumble ................................. 340/63
3,858,131  12/1974  Larsson .................................. 340/65

*Primary Examiner*—Alvin H. Waring

*Attorney, Agent, or Firm*—Irving M. Weiner; Pamela S. Burt; John L. Shortley

[57] ABSTRACT

Theft prevention apparatus for vehicles which includes a movement detector provided with a pointer and generating an electric potential when the pointer is moved, a transmitter connected to the movement detector and a receiver provided with a loudspeaker for being adapted to produce an alarm sound. The movement detector and the transmitter are mounted on a vehicle, and the receiver is detachably connected to the transmitter. When the receiver is detached from the connection with the transmitter, the transmitter transmits alarm signal to the receiver in response to the predetermined amount of electric potential generated by movements of the pointer of the detector which is adapted to detect movements of the vehicle. When the receiver is connected to the transmitter, the pointer of the detector is locked against its movements, whereby proper and reliable operation of the detector can be assured.

11 Claims, 5 Drawing Figures

FIG. 1
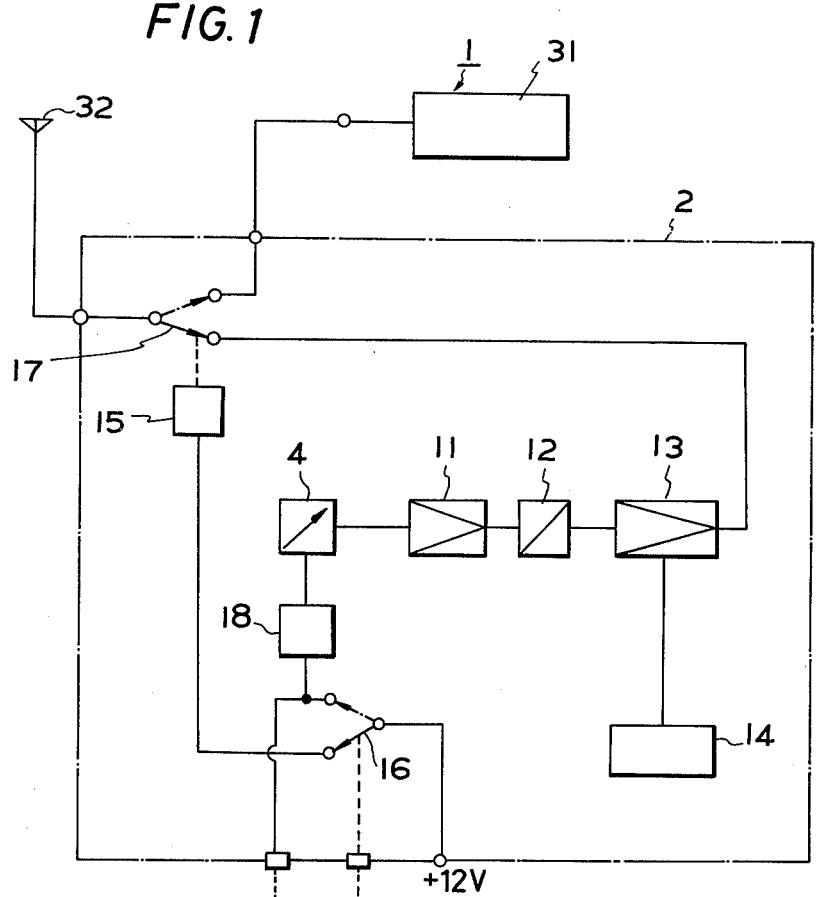
FIG. 2
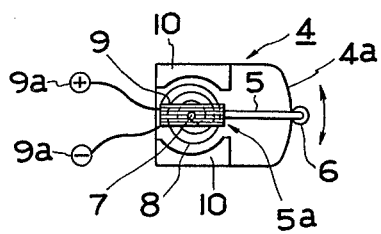
FIG. 3
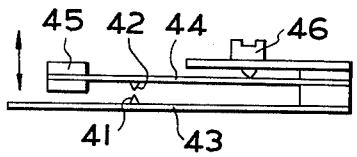
FIG. 4

THEFT PREVENTION APPARATUS FOR VEHICLES

BACKGROUND OF THE INVENTION

1. Field of the Invention

The present invention relates to a theft prevention apparatus for vehicles. More particularly, the present invention relates to an apparatus which produces an alarm sound in response to the detection of movements of the vehicle which may be caused when a person other than the driver attempts to steal the vehicle while it is parked.

2. Description of the Prior Art

There have been known theft prevention apparatus which can produce an alarm sound upon detection of unusual movements of a vehicle while it is parked. FIG. 4 of the accompanying drawings shows a conventional movement detector used in one such theft prevention apparatus.

The movement detector comprises a base plate 43 and a movable plate 44 which are spaced from each other and have confronting contacts 41, 42 provided thereon. When the movable plate 44 is moved up and down due to the action of a weight 45 attached to a distal end of the movable plate 44, the contacts 41, 42 are momentarily closed, whereupon the movement can be detected by the frequency of the closed states of the contacts 41, 42. An adjustment screw 46, when turned, changes the distance between the contacts 41, 42 so as to adjust the sensitivity of movement detection.

One of the problems with such prior movement detector is that sensitivity adjustment is difficult to perform with the screw 46, that is, it is difficult to positively determine how wide the distance between the contacts should be for the detection of attempts to steal the vehicle. Further, the distance between the contacts, even if correctly set initially, tends to vary due to vibrations as the vehicle is running. Accordingly, the prior movement detector does not provide stable and reliable operation.

SUMMARY OF THE INVENTION

It is an object of the present invention to provide a theft prevention apparatus for vehicles which produces an alarm sound in response to the detection of movements of the vehicle which may be caused when a person other than the driver attempts to steal the vehicle while it is parked, and which locks movable detector means while the vehicle is running, to thereby prevent the set condition of a movement detector from being disturbed due to vibrations. In this manner, proper operation of the movement detector can be assured.

According to the invention, the movement detector utilizes the mechanism of a moving-coil type meter, comprising a pointer having on its distal end a weight and pivotally supported at its base portion by a spiral spring, the base portion of the pointer supporting a coil thereon, and magnet poles disposed on each vertical side of the pointer base portion. While the vehicle is stopped, the detector can detect unusual movements of the vehicle to output an alarm signal current. While the vehicle is running, the coil on the pointer base portion is supplied with a current from an external source to maintain the pointer in an immovable position.

The above and other objects, features and advantages of the present invention will become apparent from the following description taken in conjunction with the accompanying drawings which illustrate a preferred embodiment of the invention by way of example.

BRIEF DESCRIPTION OF THE DRAWINGS

FIG. 1 is a circuit diagram in block form of a theft prevention apparatus constructed in accordance with the present invention.

FIG. 2 is a front elevational view of a movement detector to be employed in the theft prevention apparatus.

FIG. 3 is a side elevational view of the movement detector shown in FIG. 2.

FIG. 4 is a view showing a conventional movement detector.

DESCRIPTION OF PREFERRED EMBODIMENTS

Figure 5:
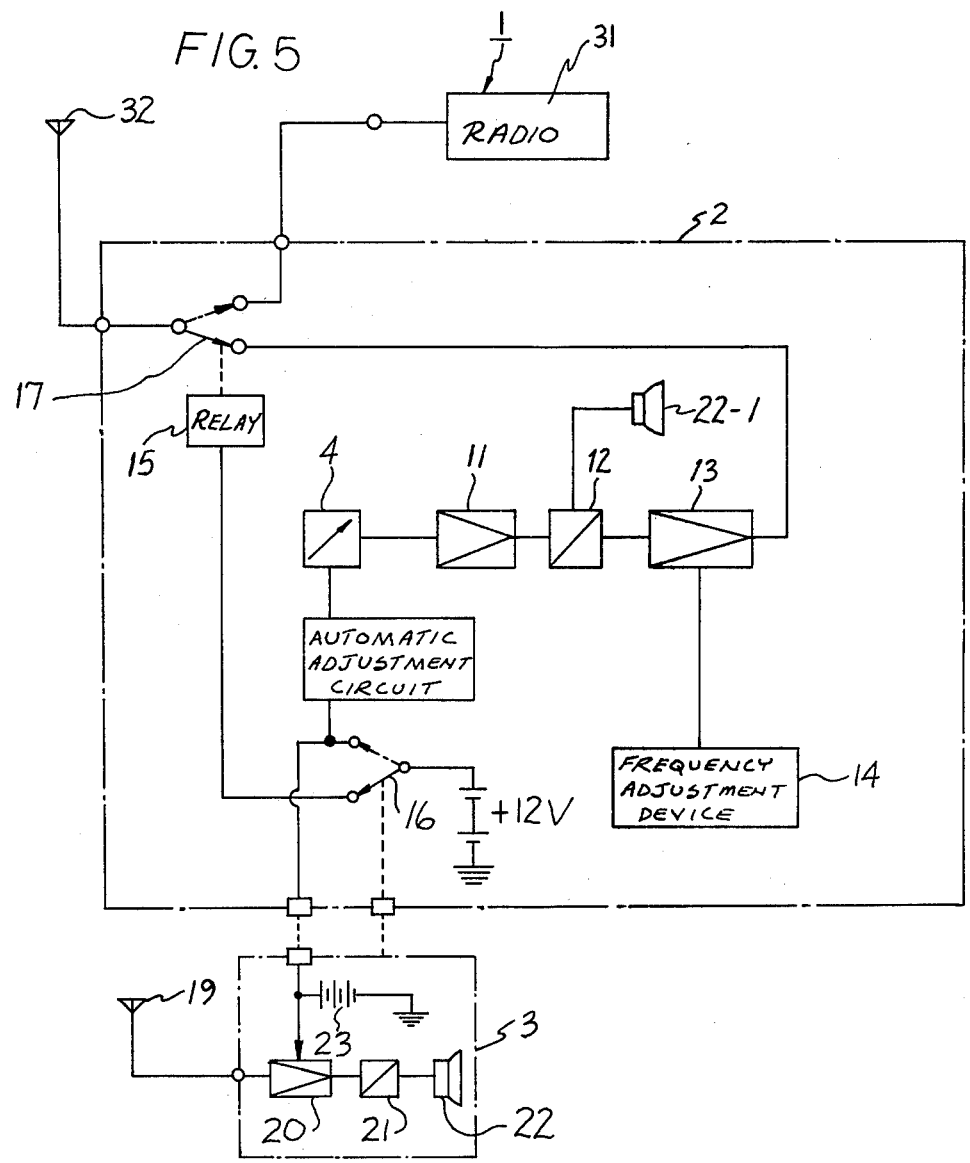
FIG. 5 shows a mondified embodiment of the invention.

As shown in FIG. 1, a theft prevention apparatus 1 according to the present invention generally comprises a main section 2 equipped with a radio 31 and a receiving antenna 32 for the radio and adapted to be mounted on a vehicle such as an automobile, and a receiver 3 which is separate from the main section 2. The main section 2 has a movement detector 4 which, as shown in FIGS. 2 and 3, is constructed of a mechanism utilizing the principles of a moving-coil type meter. More specifically, the movement detector 4 has a pointer 5 having on its distal end a weight 6, which is movable up and down along an outer surface 4a of the detector 4. The pointer 5 is pivotally supported by a shaft 7 attached to a base portion 5a of the pointer, the pointer 5 being pivotable about the shaft 7. A spiral spring 8 is disposed around the shaft 7 and acts between the shaft 7 and one end of the base portion 5a of the pointer. The movement detector 4 is calibrated so that when it is mounted on the vehicle, the pointer 5 will be directed horizontally upon de-energization of the detector. The movement detector 4 is preferably mounted beneath the dashboard of the vehicle.

Mounted on the base portion 5a of the pointer 5 is a coil 9 with its terminal ends 9a, 9a disposed for external connection. A pair of north and south poles 10, 10 of a magnet are located upwardly and downwardly of the coil 9, respectively.

With such an arrangement, the movement detector 4 can detect slight movements in such a manner that when the pointer 5 moves slightly out of its horizontal reference position under the influence of applied motion, there will be generated a voltage across the terminal ends 9a, 9a in response to the angular movement of the pointer 5. Accordingly, sensitivity adjustment can easily be effected and stable sensitivity can be maintained at all times.

The movement detector 4 has its output connected to an amplifier circuit 11 which is coupled to a signal switch 12, to which there is connected a high-frequency transmitter 13. When the pointer 5 is angularly moved through a pre-determined angle, the detector 4 produces a voltage for actuating the signal switch 12, which then enables the high-frequency transmitter 13 to generate an alarm signal of a high frequency. The high-frequency transmitter 13 is connected to an adjustment device 14 for varying the frequency or tone of a transmitting signal so as to prevent interference with alarm signals produced by similar apparatus 1.

The main section 2 also has a pair of switches 16, 17 which are ganged together by means of a relay 15. When the switch 16 has its movable contact in the position of the solid line by detachment of the receiver 3 from the main section 2, the relay 15 is energized, whereupon the movable contact of the switch 17 is maintained in the solid line position, thereby connecting the high-frequency transmitter 13 to the antenna 32. When the movable contact of the switch 16 is in the position of the dot-and-dash line by attachment of the receiver 3 to the main section 2, the relay 15 is de-energized to cause the movable contact of the switch 17 to move to the dot-and-dash line position, thereby connecting the radio 31 to the antenna 32.

When the movable contact of the switch 16 is in the dot-and-dash line position, it allows a voltage of 12 V from the battery on the vehicle to be applied via an automatic adjustment circuit 18 across the terminals 9a, 9a of the movement detector 4. An electric current then flows through the moving coil 9, biasing the pointer 5 to one side against wobbling movement due to vibrations which take place while the vehicle is running.

The receiver 3 is preferably incorporated in a pocket-sized carry-on buzzer, comprising a receiving antenna 19, an amplifier circuit 20, a signal switch 21, a loudspeaker 22, and a battery 23, the receiver 3 being attachable to the main section 2 of the apparatus 1. When the receiver 3 is not attached to the main section 2, the loudspeaker 22 produces an alarm sound in response to the reception of an alarm signal transmitted via the antenna 32 from the main section 2. Conversely, when the receiver 3 is attached to the main section 2, the movable contact of the switch 16 is caused to be in the dot-and-dash line position, and the receiver 3 is connected via the switch 16 to the battery of 12 V, which enables the battery 23 to be charged.

When a driver gets off the vehicle equipped with the apparatus 1, with the receiver 3 in his hand, the pointer 5 of the movement detector 4 becomes freely movable. Movements of the vehicle which may be caused by a person attempting to steal the vehicle cause the pointer 5 to move, whereupon the movement detector 4 becomes actuated to enable the high-frequency transmitter 13 to transmit an alarm signal via the antenna 32. Then the receiver 3, upon receiving such alarm signal generates an alarm sound via the loudspeaker 22. The driver is now aware of the fact that the vehicle is under the attack of a thief, and can immediately do something necessary to prevent the theft.

While the vehicle is being driven, the receiver 3 is mounted on the main section 2 of the apparatus 1. Therefore, the pointer 5 of the movement detector 4 is fixed in position, with the result that the movement detector 4 will not be energized even if the vehicle is subjected to vibrations while running. At the same time, the battery of the receiver 3 can be charged, and the radio 31 can receive radio waves through the antenna 32.

Although the present invention has been shown applied to a vehicle with the radio 31 and the antenna 32, the invention is also applicable to vehicles with other equipment. The receiver 3 may be dispensed with, and the main section 2 of the apparatus may have suitable provision for producing an alarm sound. For example, as shown in FIG. 5, if a loudspeaker 22-1 is inseparably connected to the main section 2, the main section 2 can produce an alarm sound without employing the separate receiver 3. The movement detector 4 is not limited to a moving-coil type structure, but may be of other structures of similar function. The direction of angular movement of the pointer 5 may be other than vertical depending upon the type of vehicles.

It should be understood that various changes and modifications can be made in the preferred embodiment without departing from the scope of the appended claims.

I claim:

1. A theft prevention apparatus for a vehicle, comprising:

a movement detector provided with a pointer;

said movement detector including means for generating an electric potential when said pointer is moved;

said means for generating an electric potential including a coil mounted on a base portion of said pointer of said movement detector, and magnet poles disposed on each side, in the vertical direction, of said coil at a proper distance from said coil;

a transmitter connected to said movement detector;

a receiver provided with a loudspeaker and adapted for receiving an alarm signal from said transmitter;

said transmitter transmitting said alarm signal to said receiver in response to a predetermined amount of electric potential when said pointer of said movement detector is moved a predetermined degree; and said pointer of said movement detector being switchable to its fixed condition against movements by applying an electric potential to said movement detector.

2. An apparatus according to claim 1, wherein said movement detector is of the moving-coil type.

3. A theft prevention apparatus for a vehicle, comprising:

a movement detector provided with a pointer;

said movement detector including means for generating an electric potential when said pointer is moved;

a transmitter connected to said movement detector;

a receiver provided with a loudspeaker and adapted for receiving an alarm signal from said transmitter;

said transmitter transmitting said alarm signal to said receiver in response to a predetermined amount of electric potential when said pointer of said movement detector is moved a predetermined degree;

said pointer of said movement detector being switchable to its fixed condition against movements by applying an electric potential to said movement detector; and said pointer of said movement detector including a spiral coil spring connected at one end to a shaft about which said pointer pivotally moves, said pointer being provided at the distal end thereof with a weight and being connected at other end thereof with the other end of said spiral spring so that said pointer is normally directed substantially horizontally.

4. An apparatus according to claim 3, wherein:

said means for generating an electric potential includes a coil mounted on a base portion of said pointer of said movement detector, and magnet poles disposed on each side, in the vertical direction, of said coil at a proper distance from said coil.

5. An apparatus according to claim 3 or 4, wherein: said movement detector is of the moving-coil type.

6. A theft prevention apparatus for a vehicle, comprising:

a movement detector provided with a pointer;
said movement detector including means for generating an electric potential when said pointer is moved;
a transmitter connected to said movement detector;
a receiver provided with a loudspeaker and adapted for receiving an alarm signal from said transmitter;
said transmitter transmitting said alarm signal to said receiver in response to a predetermined amount of electric potential when said pointer of said movement detector is moved a predetermined degree;
said pointer of said movement detector being switchable to its fixed condition against movements by applying an electric potential to said movement detector;
said transmitter being mounted on said vehicle;
said receiver being detachably attached to said transmitter;
said pointer being set so as to be movable when no electric potential is supplied to said movement detector from a battery on said vehicle, when said receiver is detached from said transmitter; and
said pointer being set so as to be immovable when electric potential is supplied to said movement detector by said vehicle battery when said receiver is attached to said transmitter.

7. An apparatus according to claim 1, wherein:
said loudspeaker is inseparably connected to said transmitter such that said transmitter can produce an alarm sound without employing said receiver.

8. An apparatus according to claim 1, further including an adjustment device connected to said transmitter for varying the frequency or tone of a transmitting signal to prevent interference of alarm signals.

9. An apparatus according to claim 3, wherein:
said vehicle is provided with a radio and a receiving antenna for said radio;
said apparatus further includes a switch for connecting said receiving antenna to either one of said transmitter or said radio;
said movement detector, said transmitter, and said switch are included within a main section of said apparatus;
said receiver is separated from said main section;
said transmitter transmits an alarm signal via said antenna to said receiver in response to a predetermined amount of electric potential generated by movements of said pointer of said movement detector a predetermined degree when said switch connects said transmitter to said antenna; and
said movement detector is supplied with an electric potential to hold said pointer in an immovable position when said switch connects said radio to said antenna.

10. An apparatus according to claim 9, wherein said movement detector is of the moving-coil type.

11. An apparatus according to claim 9, wherein:
said receiver includes a battery which is charged by being attached to said main section when said switch connects said radio to said antenna.

* * * * *